US012654785B2

(12) United States Patent
Jansen

(10) Patent No.: US 12,654,785 B2
(45) Date of Patent: Jun. 16, 2026

(54) WHEEL COVER HOLDER FOR A WHEEL OF A VEHICLE

(71) Applicant: LIGHTYEAR IPCO B.V., Helmond (NL)

(72) Inventor: Wouter Lukas Jansen, Eindhoven (NL)

(73) Assignee: LIGHTYEAR IPCO B.V., Helmond (NL)

( * ) Notice: Subject to any disclaimer, the term of this patent is extended or adjusted under 35 U.S.C. 154(b) by 270 days.

(21) Appl. No.: 18/282,180

(22) PCT Filed: Mar. 24, 2022

(86) PCT No.: PCT/EP2022/057749
§ 371 (c)(1),
(2) Date: Sep. 14, 2023

(87) PCT Pub. No.: WO2022/200491
PCT Pub. Date: Sep. 29, 2022

(65) Prior Publication Data
US 2024/0149957 A1     May 9, 2024

(30) Foreign Application Priority Data

Mar. 24, 2021    (NL) ..................................... 2027830

(51) Int. Cl.
*B62D 35/02* (2006.01)
*B62D 25/16* (2006.01)
*B62D 25/18* (2006.01)

(52) U.S. Cl.
CPC ........... *B62D 35/02* (2013.01); *B62D 25/163* (2013.01); *B62D 25/18* (2013.01)

(58) Field of Classification Search
CPC ...... B62D 35/02; B62D 25/163; B62D 25/18; B62D 25/16; B62D 35/00; B60R 13/0861
See application file for complete search history.

(56) References Cited

U.S. PATENT DOCUMENTS 2,017,227 A * 10/1935 Barnhart .............. B62D 25/186
280/849
2,336,536 A * 12/1943 Fergueson ........... B62D 25/184
292/241

(Continued)

FOREIGN PATENT DOCUMENTS

CN          107336752 A * 11/2017 ............. B62D 25/16
DE          723125 C      7/1942

(Continued)

OTHER PUBLICATIONS

Translated DE-102016212267-A1 (Year: 2025).*

(Continued)

*Primary Examiner* — James A Shriver, II
*Assistant Examiner* — Ian Bryce Shelton
(74) *Attorney, Agent, or Firm* — Patterson + Sheridan, LLP

(57) ABSTRACT

The invention pertains to a wheel cover holder (4) for a wheel (3) of a vehicle (25), which wheel (3) is turnable relative to the vehicle (25) over a turning angle (a), wherein the wheel cover holder (4) is configured to hold at least one air-guiding cover (5, 14); the wheel cover holder (4) being configured to be connected to a steering mechanism (13) of the wheel (3) such that the wheel cover holder is turnable by the steering mechanism (13) during the steering of the wheel (3), wherein the wheel cover holder (4) is configured to turn along with the wheel (3) if the turning angle (a) is greater than a turning angle threshold, and to remain in a neutral position if the turning angle (a) is smaller than the turning angle threshold. The invention further pertains to a vehicle (25) comprising such a wheel cover holder (4).

15 Claims, 12 Drawing Sheets

(56)             References Cited

U.S. PATENT DOCUMENTS

Figure 1A:
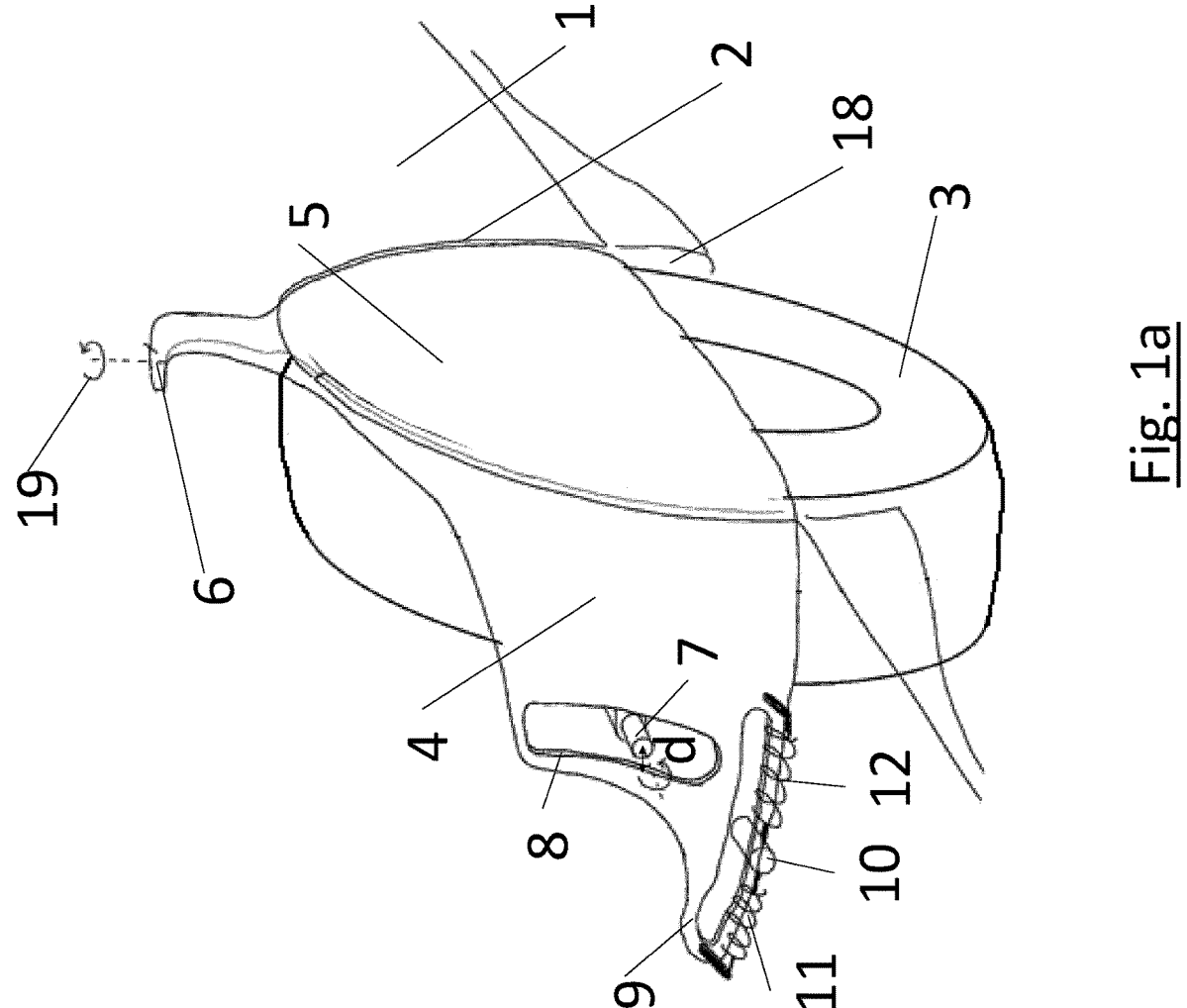

| | | | | |
|---|---|---|---|---|
| 6,007,102 | A * | 12/1999 | Helmus | B62D 25/182 |
| | | | | 280/847 |
| 7,997,640 | B1 * | 8/2011 | Wurm | B62D 25/186 |
| | | | | 296/180.1 |
| 10,494,033 | B2 * | 12/2019 | Haeseker | B62D 25/182 |
| 11,072,374 | B2 * | 7/2021 | Gandhi | B62D 37/02 |
| 11,352,068 | B2 * | 6/2022 | Ballarin | B62D 35/00 |
| 11,807,041 | B2 * | 11/2023 | Smith | B60B 7/063 |
| 12,128,955 | B2 * | 10/2024 | Favaretto | B62D 35/00 |
| 12,304,572 | B2 * | 5/2025 | Chevar | B62D 25/16 |
| 2013/0096781 | A1 * | 4/2013 | Reichenbach | B60Q 1/326 |
| | | | | 280/849 |
| 2018/0257716 | A1 * | 9/2018 | Haeseker | B62D 25/166 |
| 2019/0210657 | A1 * | 7/2019 | Gandhi | B62D 37/02 |
| 2020/0283072 | A1 * | 9/2020 | Ballarin | B60B 7/00 |
| 2022/0024246 | A1 * | 1/2022 | Smith | B60B 7/0026 |
| 2022/0289305 | A1 * | 9/2022 | Favaretto | B62D 35/00 |
| 2023/0109675 | A1 * | 4/2023 | Chevar | B62D 35/00 |
| | | | | 296/180.1 |

FOREIGN PATENT DOCUMENTS

| | | | | | |
|---|---|---|---|---|---|
| DE | 102016212267 | A1 * | 12/2017 | ............ | B62D 25/16 |
| FR | 2950598 | A1 * | 4/2011 | .......... | B62D 25/186 |
| JP | S59192678 | A * | 11/1984 | | |
| JP | S6136064 | A * | 2/1986 | | |
| JP | 104176784 | A | 6/1992 | | |
| JP | H04176783 | A | 6/1992 | | |
| JP | H04176784 | A * | 6/1992 | | |
| WO | WO-9528300 | A1 * | 10/1995 | .......... | B62D 25/186 |
| WO | WO-2016197161 | A1 * | 12/2016 | ............ | B62D 35/00 |

OTHER PUBLICATIONS

Translated JP-H04176784-A (Year: 2025).*
Translated WO-2016197161-A1 (Year: 2025).*
Netherlands Search Report and Written Opinion dated Oct. 5, 2021, for Netherlands Patent Application No. 2027830.
PCT International Search Report and Written Opinion dated Jul. 18, 2022, for International Application No. PCT/EP2022/057749.

* cited by examiner

WHEEL COVER HOLDER FOR A WHEEL OF A VEHICLE

This invention relates to a wheel cover holder for a wheel of a vehicle and a vehicle comprising such a wheel cover holder.

Vehicles in general experience several forms of drag, reducing energy efficiency. Reducing drag is desirable in order to build vehicles having increased energy efficiency, as they provide cost- and environment-friendly transportation means. Aerodynamic drag in particular is the cause of reduced energy efficiency, especially at high velocities of the vehicle, as the aerodynamic drag increases by the square of the velocity. By shaping the body of the vehicle in an aerodynamically efficient way, aerodynamic drag can be decreased, which can increase the energy efficiency. However, the body of the vehicle typically comprises several openings. For example, each wheel may be arranged in a wheel housing. A wheel housing opening on the side of the vehicle, as well as an opening on the bottom of the vehicle which allows a wheel to turn within the wheel housing, cause turbulent airflow, which increases the aerodynamic drag of the vehicle.

It is an object of the invention to reduce the aerodynamic drag of a vehicle, and/or to provide an improved wheel cover holder, and/or to provide an alternative for the prior art.

In the invention, one or more of the above objects are achieved by a wheel cover holder for a wheel of a vehicle, which wheel is turnable relative to the vehicle over a turning angle, wherein:

the wheel cover holder is configured to hold at least one air-guiding cover;

the wheel cover holder being connectable to a steering mechanism of the wheel, e.g. via an upright of the steering mechanism or wheel hub, such that the wheel cover holder is turnable by the steering mechanism during the steering of the wheel, wherein the wheel cover holder is configured to turn along with the wheel if the turning angle is larger than a turning angle threshold, and optionally to remain in a neutral position if the turning angle is smaller than the turning angle threshold.

A vehicle comprises one or more wheels, for example four, each rotatable against a surface, propelling the vehicle. The one or more wheels of the vehicle may be powered or passive and may be steerable. Optionally, a wheel of the vehicle is powered, e.g., by an in-wheel motor, and steerable. The vehicle is for example an automobile, e.g. a commercially available automobile for use on public roads. The vehicle is for example an at least partially electrically powered vehicle. The vehicle is for example an electrically powered vehicle, further comprising one or more solar panels for providing power.

The wheel cover holder for a wheel of the vehicle according to the invention is configured to hold at least one air-guiding cover. The air-guiding cover is configured to guide the air, e.g. around the vehicle, when the vehicle is travelling. This may streamline the airflow, reduce disturbances, and subsequently, reduce drag caused by turbulent airflow, and increase energy efficiency.

A wheel of the vehicle may be turnable relative to the vehicle over a turning angle. The turning of the wheel is, e.g., the result of the operator of the vehicle turning a steering wheel or an automated system actuating a steering mechanism. The steering of the wheel causes the vehicle to, for example, take a turn, or to avoid an obstacle. If the wheel is turnable, the wheel cover holder is configured to turn along with the wheel. When an air-guiding cover is held by the wheel cover holder, the air-guiding cover is turned as well. This turning of the wheel cover holder prevents the wheel that is turned from making contact with the wheel cover holder and/or the air-guiding cover(s).

The drag reduction effect of the wheel cover holder may be highest if the wheel cover holder remains in a neutral position. The neutral position of the wheel cover holder is a position in which the wheel cover holder protrudes the least from the vehicle body. In the neutral position, the airflow may be streamlined around the vehicle. Therefore, the wheel cover holder optionally remains in a neutral position if the wheel is only turned at a small turning angle, i.e., the wheel is turned with a turning angle that is smaller than a turning angle threshold. The aerodynamic drag experienced by the vehicle increases if the velocity of the vehicle increases. The wheel cover holder is configured to improve the aerodynamic drag reduction of the vehicle at high speeds where turning angles are typically relatively small. If the wheel is turned over a relatively small turning angle, the wheel cover holder is optionally configured to stay in the neutral position. In an embodiment of the invention, the wheel cover holder is configured to stay in the neutral position if the turning angle is smaller than the turning angle threshold. The wheel cover holder also allows the wheel to be turned over relatively large turning angles by turning along with the wheel. This typically occurs at lower speeds, where the aerodynamic drag experienced by the vehicle is lower. However, it is also envisaged that the wheel cover holder can be configured to turn along with the wheel at all turning angles.

An air-guiding cover may be, for example, a wheel cover that covers the wheel housing opening at least partially, optionally fully. In another example, the air-guiding cover may be a butterfly hole cover, which covers a hole between the floor of the body and the wheel at least partially, optionally fully.

A steering mechanism of the vehicle is configured to turn the vehicle in response to, for example, a driver turning a steering wheel, or a command from an automated system. The steering mechanism is connected, for example mechanically, to a wheel hub and/or upright of the steering mechanism. The wheel hub and/or upright of the steering mechanism is connected, for example mechanically, to the wheel. The wheel cover holder is configured to be connected to a steering mechanism of the wheel, e.g. to an upright of the steering mechanism of the steering mechanism or to the wheel hub. It may be directly connected, for example mechanically, to the upright of the steering mechanism or wheel hub. The wheel cover holder may be configured to turn along with the wheel as it is moved by the steering mechanism. The turning of the wheel cover holder is for example achieved by a connection between the steering mechanism and the wheel cover holder, which causes the wheel cover holder to follow the turning angle of the wheel indirectly. Alternatively, the turning of the wheel cover holder is achieved by a connection between the upright of the steering mechanism or the wheel hub, which causes the wheel cover holder to follow the turning angle of the wheel directly.

In embodiments, the turning angle threshold is between 1-5 degrees, preferably between 2-3 degrees. At high velocities of the vehicle, it is expected that in general, the vehicle drives substantially straight ahead. In general, the wheel will not turn more than a few degrees at said high velocities for making the required turns with the vehicle. Such turns usually relate to relatively small deviations in the trajectory of the vehicle, such as a lane shift on a highway. If the wheel is turned at relatively small turning angles, the wheel cover holder may remain in a neutral position, which may maximize the drag reduction effect. This is in particular advantageous at high velocities, because the aerodynamic drag increases as the velocity of the vehicle increases.

According to further embodiments of the invention, the at least one air-guiding cover comprises a wheel cover, wherein the wheel cover holder is configured to hold the wheel cover substantially vertically adjacent to the wheel on an outside of the wheel.

In these embodiments, the wheel cover is held substantially vertically adjacent to the outside of the wheel that is facing towards the outside of the vehicle body. The wheel cover is an air-guiding cover that is configured to at least partially, optionally fully, cover the outside of the wheel. In the area around the outside of the wheel, the body of the vehicle comprises a wheel housing opening. The wheel housing opening reveals the wheel and allows the wheel to be turned. The wheel cover, by covering the outside of the wheel that is facing towards the outside of the vehicle body, covers the wheel housing opening at least partially, optionally fully. Optionally, the wheel cover covers at least 50% of the wheel housing opening. Preferably, the wheel cover covers at least 60%, e.g. at least 70%, e.g. at least 80%, e.g., at least 90% of the wheel housing opening. Optionally, the wheel cover extends vertically such that its lower side is arranged parallel to the underside of the body of the vehicle.

The wheel cover is arranged to reduce the drag caused by the air flowing into the wheel housing opening. The wheel cover may be aligned with the wheel housing opening to cover the wheel housing opening at least partially, optionally fully. In embodiments, the wheel cover is arranged such that instead of the air flowing into the wheel housing opening, the air flows along the side of the vehicle towards the rear end of the vehicle. The wheel cover, for example, has a substantially semi-circular shape. The wheel cover is manufactured from e.g. plastic or metal.

The wheel cover holder is configured to follow a turning angle of the wheel, if the turning angle is larger than a turning angle threshold. In these embodiments, the wheel cover holder holds a wheel cover, which follows the turning angle of the wheel if the angle is larger than a turning angle threshold. The aerodynamic drag reduction effect may be greatest when the wheel cover is a neutral position, arranged parallel to the outside of the body. If the wheel is turned with a relatively large angle, however, the wheel cover follows the turning angle of the wheel and is moved into the airflow around the vehicle. This increases the drag and is most pronounced when the vehicle is travelling at high velocities. It is expected that large turning angles occur most frequently when the velocity of the vehicle is low, e.g., to turn the vehicle to make a right or left turn on an intersection. At high velocities, the turning angles are typically smaller. Hence, the aerodynamic streamlining effect is enhanced by keeping the wheel cover in a neutral position if the turning angle of the wheel is relatively small.

According to further embodiments of the invention, the wheel cover holder further comprises a wheel cover, wherein the wheel cover is attached to the wheel cover holder in a releasable or a non-releasable manner.

In one variant of these embodiments, the wheel cover is attached to the wheel cover holder in a releasable manner, which is advantageous, e.g., for maintenance purposes: the wheel cover can be serviced or replaced in case it is damaged without having to replace the complete wheel cover holder. Another advantage is for example that the wheel is easily reached after removing the releasable wheel cover. The wheel cover holder can e.g. comprise a number of holes for receiving a number of bolts. The connection between the releasable wheel cover and wheel cover holder can then be made with, for example, a number of bolts that are placed through a same number of holes of the wheel cover and are received by a same number of holes in the wheel cover holder.

In another variant of these embodiments, the wheel cover is attached to the wheel cover holder in a non-releasable manner, by for example welding it to the wheel cover holder, or by integrating the wheel cover holder and the wheel cover with each other into a unitary element. Advantages of the wheel cover being attached to the wheel cover holder in a non-releasable manner are for example ease of manufacturing, and a reduction in the number of parts.

According to further embodiments of the invention, the at least one air-guiding cover comprises a butterfly hole cover, wherein the wheel cover holder is configured to hold the butterfly hole cover substantially horizontally adjacent to the wheel on an inside of the wheel.

A butterfly hole is a cutout in the bottom plate of the body of the vehicle, which accommodates a wheel. The butterfly hole is situated in an area adjacent an inside of the wheel, i.e., the side of the wheel that is facing towards the body of the vehicle. The butterfly hole allows the wheel to turn, where if the wheel is turned by the turning angle, it does not come into contact with the body of the vehicle. The butterfly hole has a shape that allows the wheel to turn, for example a substantially semicircular shape. The wheel of a vehicle may typically not be turned over angles larger than 45°. So, alternatively, the butterfly hole may have a shape resembling a "butterfly wing". In this case, the area in which the wheel can never turn is covered by a lip protruding from the underside of the bottom plate of the body of the vehicle. The butterfly hole allows air to enter into the wheel housing, causing turbulent airflow, and subsequently, causing drag.

In these embodiments, the wheel cover holder comprises a butterfly hole cover, which is held substantially parallel to the underside of the body by the wheel cover holder. The butterfly hole cover is arranged to reduce turbulent airflow within the wheel housing resulting from air from entering the wheel housing via the underside of the vehicle through the butterfly hole. The butterfly hole cover may streamline the airflow on the underside of the vehicle by guiding the air along the underside of the vehicle from the front of the vehicle to the back of the vehicle. The butterfly cover covers the butterfly hole at least partially, optionally fully. Preferably, the butterfly hole cover covers the butterfly at least 60%, e.g. at least 70%, e.g. at least 80%, e.g., at least 90%. The butterfly hole cover for example has a substantially semi-circular shape. The butterfly hole cover is manufactured from a suitable material, e.g., plastic or metal.

The wheel cover holder is configured to follow a turning angle of the wheel, if the turning angle is larger than a turning angle threshold. In these embodiments, the wheel cover holder holds a butterfly hole cover, which follows the turning angle of the wheel if the angle is larger than a turning angle threshold. If the turning angle of the wheel is smaller than the turning angle threshold, the wheel cover holder remains in a neutral position. This improves the aerodynamic effect of the wheel cover holder and the butterfly hole cover. Optionally, the wheel cover holder is configured to turn along with the wheel at all turning angles.

In one variant of these embodiments, the butterfly hole cover is attached to the wheel cover holder in a releasable manner, which is advantageous, e.g., for maintenance purposes: the butterfly hole cover can be serviced or replaced in case it is damaged without having to replace the complete wheel cover holder. Another advantage is for example that the wheel is easily reached after removing the releasable butterfly hole cover. The wheel cover holder can e.g. comprise a number of holes for receiving a number of bolts. The connection between the releasable butterfly hole cover and wheel cover holder can then be made with, for example, a number of bolts that are placed through a same number of holes of the butterfly hole cover and are received by a same number of holes in the wheel cover holder.

In another variant of these embodiments, the butterfly hole cover is attached to the wheel cover holder in a non-releasable manner, by for example welding it to the wheel cover holder, or by integrating the wheel cover holder and the butterfly hole cover with each other into a unitary element. Advantages of the butterfly hole cover being attached to the wheel cover holder in a non-releasable manner are for example ease of manufacturing, and a reduction in the number of parts.

According to further embodiments of the invention, the wheel cover holder is configured to hold both the wheel cover and the butterfly hole cover. This combines the effects of the wheel cover and butterfly hole cover, and may streamline the airflow both on the side of the vehicle as on the underside of the vehicle. This may further increase the energy efficiency of the vehicle. The wheel cover holder is configured to follow a turning angle of the wheel, if the turning angle is larger than a turning angle threshold. In these embodiments, the wheel cover holder holds a wheel cover and a butterfly hole cover. Both the wheel cover and the butterfly hole cover follow the turning angle of the wheel if the angle is larger than a turning angle threshold. If the turning angle of the wheel is smaller than the turning angle threshold, the wheel cover holder, as well as the wheel cover and the butterfly hole cover, remain in a neutral position. This improves the aerodynamic effect of the wheel cover holder. Optionally, the wheel cover holder is configured to turn along with the wheel at all turning angles.

According to further embodiments of the invention, the wheel cover holder and the butterfly hole cover are integrated with each other into a unitary element, and/or the wheel cover holder and the wheel cover are integrated with each other into a unitary element, and/or the wheel cover holder, the wheel cover and the butterfly hole cover are integrated with each other into a unitary element. This may increase the ease of manufacturing and reduce the number of parts. It may further simplify the construction, reduce the wear of the part(s), and it may further improve the movement of the wheel cover holder as it moves as a unitary element.

According to further embodiments of the invention, the wheel cover holder is configured to allow the wheel to move in a vertical direction, relative to the wheel cover holder.

Due to e.g. unevenness in the surface on which the vehicle travels, the wheels of the vehicle may move in a vertical direction relative to the body. The shocks of the movement are typically absorbed at least partially by a spring mechanism. The wheel cover holder is configured to allow the vertical movement of the wheel relative to the wheel cover holder. Thus, the wheel cover holder remains in a stationary vertical position relative to the vertical movement of the wheel. By allowing vertical movement of the wheel relative to the wheel cover holder, the wheel cover holder can be placed close to the edges of the wheel housing, enhancing the drag reducing effect by covering more area around the wheel.

In the embodiments where the wheel cover holder comprises a wheel cover, the wheel cover is placed close to the upper side of the wheel housing. This reduces the size of any gaps between the wheel cover and the wheel housing. Optionally, no gaps remain between the wheel cover and the wheel housing. This may further improve the aerodynamic effect of the wheel cover holder and/or the wheel cover. A further advantage of reducing the size of the gaps between the wheel cover and the wheel housing is that the wheel can be placed close to the outside of the body of the vehicle. This may improve the handling of the vehicle.

In the embodiments where the wheel cover holder comprises a butterfly hole cover, the butterfly hole cover is arranged to remain substantially parallel to the underside of the body of the vehicle. In these embodiments, the butterfly hole cover is placed close to the edge of the wheel housing. This reduces the size of any gaps between the butterfly hole cover and the wheel housing. Optionally, no gaps remain between the butterfly hole cover and the wheel housing. This may further improve the aerodynamic effect of the wheel cover holder and/or the butterfly hole cover. Further, the shape and construction of the wheel cover holder and/or the wheel cover and/or the butterfly hole cover may be simplified since they remain stationary in the vertical direction.

According to further embodiments of the invention, the wheel cover holder comprises at least one connector slot for receiving a steering mechanism connector, the at least one connector slot configured to:

a. allow the connector to move relative to the wheel cover holder in the direction of the turning angle of the wheel if the turning angle is smaller than the turning angle threshold, and b. be moved by the connector if the turning angle is larger than the turning angle threshold for turning the wheel cover holder along with the wheel.

A steering mechanism of the vehicle is configured to turn a wheel of the vehicle in response to, for example, the driver turning a steering wheel. To turn the wheel cover holder along with the wheel, a steering mechanism connector is provided. The steering mechanism connector is connected to, e.g., a wheel hub or an upright of the steering mechanism. The connector slot of the wheel cover holder is configured to hold the steering mechanism connector. In these embodiments, the connector slot is configured to come into contact with the steering mechanism connector, turning the wheel cover holder as the steering mechanism connector is pushed towards an outside of the connector slot. The connector slot is optionally configured such that the steering mechanism connector can move within the connector slot in the direction of the turning angle of the wheel if the turning angle is smaller than the turning angle threshold. If the turning angle is smaller than the turning angle threshold, the steering mechanism connector is optionally configured to not come into contact with the wheel cover holder, thus not turning the wheel cover holder. In these embodiments, if the wheel is turned over a relatively small turning angle, the wheel cover holder is configured to allow turning of the wheel within the wheel wheel cover holder without the wheel making contact with the wheel wheel cover holder. If the turning angle is larger than the turning angle threshold, the connector slot is configured to move the wheel cover holder along with the wheel. For example, the steering mechanism connector might come into contact with the connector slot, which pushes the wheel cover holder in the direction of the turning angle. In an exemplary embodiment, the turning angle threshold is between 1-5 degrees, preferably between 2-3 degrees.

In case the steering mechanism connector makes contact with the wheel cover holder, e.g., by coming into contact with the connector slot, a frictional force may be generated. Optionally, the sides of the connector slot are lined with protective material, such as for example rubber. The protective material may reduce the wear of the parts that come into contact and produce the frictional force. Optionally, the protective material is arranged such that the steering mechanism connector can move within the connector slot in the direction of the turning angle of the wheel if the turning angle is smaller than the turning angle threshold. Optionally, the protective material is compressible, and is arranged such that the steering mechanism connector compresses the protective material if the turning angle is smaller than the turning angle threshold.

Optionally, in a variant of this embodiment, the at least one connector slot is configured to allow the steering mechanism connector to move in a vertical direction relative to the wheel cover holder during movement of the wheel in the vertical direction.

The wheels of the vehicle may move in a vertical direction relative to the body due to, e.g., unevenness in the surface on which the vehicle travels. The steering mechanism connector follows the vertical movement of the wheel if it is, e.g., connected to a wheel hub or an upright of the steering mechanism. The connector slot is configured to allow the vertical movement of the steering mechanism connector, which avoids the steering mechanism connector coming into contact with the top or bottom side of the connector slot. Thus, the wheel cover holder remains in a stationary vertical position relative to the vertical movement of the wheel. By allowing vertical movement of the wheel relative to the wheel cover holder, the wheel cover holder can be placed close to the edges of the wheel housing. This may enhance the drag reducing effect by covering a larger area around the wheel. Further, the shape and construction of the wheel cover holder may be simplified.

According to further embodiments of the invention, the wheel cover holder further comprises a ball joint or a cylinder bearing for connecting the wheel cover holder to a body of a vehicle. This ball joint or cylinder bearing acts as a connection point, and is configured to allow the movement of the wheel cover holder to follow a turning angle of a wheel of the vehicle, and attaches the wheel cover holder to the body of the vehicle. The ball joint or cylinder bearing is e.g. located at the top of the wheel cover holder, e.g. to attach the wheel cover holder to the inside of the wheel housing.

According to further embodiments of the invention, the wheel cover holder comprises at least one connector slot for receiving a steering mechanism connector and the at least one connector slot is configured to allow the steering mechanism connector to move in a vertical direction relative to the wheel cover holder during movement of the wheel in the vertical direction.

The wheels of the vehicle may move in a vertical direction relative to the body due to, e.g., unevenness in the surface on which the vehicle travels. The steering mechanism connector follows the vertical movement of the wheel if it is, e.g., connected to a wheel hub or an upright of the steering mechanism. The connector slot is configured to allow the vertical movement of the steering mechanism connector, which avoids the steering mechanism connector coming into contact with the top or bottom side of the connector slot. Thus, the wheel cover holder remains in a stationary vertical position relative to the vertical movement of the wheel. By allowing vertical movement of the wheel relative to the wheel cover holder, the wheel cover holder can be placed close to the edges of the wheel housing. This may enhance the drag reducing effect by covering a larger area around the wheel. Further, the shape and construction of the wheel cover holder may be simplified.

According to further embodiments of the invention, the wheel cover holder comprises at least one guiding slot for receiving a vehicle body element, wherein the at least one guiding slot is configured to allow the wheel cover holder to turn relative to the vehicle body element.

In these embodiments, the wheel cover holder is connected to a vehicle body of the vehicle and is arranged to move along with the wheel as it is turned over a turning angle relative to the body of the vehicle. To ensure that the wheel cover holder moves along with the wheel in the direction of a turning angle, at least one guiding slot is provided, which is configured to receive a vehicle body element. The guiding slot is configured to allow the wheel cover holder to turn relative to the vehicle body element. The guiding slot optionally further restricts movement in other directions, e.g. in a vertical direction or in rotational directions which do not correspond with the direction in which the wheel is turned.

According to further embodiments of the invention, the wheel cover holder comprises a rail, arranged to be moveable relative to one or more guide elements, the guide elements being attachable to the vehicle body. Alternatively, the rail may be attachable to the vehicle body and the guide elements may be part of the wheel cover holder.

In these embodiments, the rail and the guide elements are arranged such that the path along which the wheel cover holder moves is controlled. In particular, the rail and the guide elements may reduce or eliminate movement of the wheel cover holder in a direction other than the direction in which the wheel cover holder is turned. In particular, the rail and the guide elements may ensure that a minimum spacing between the wheel cover holder and the inside of the wheel housing, i.e., a split line, is maintained. The rail is for example a tube or rod, the cross-section of this tube or rod for example being circular, square, oval, or T- or I-shaped. The guide elements are for example wheels, optionally grooved wheels, along which the rail slides. Alternatively, the guide elements are for example hollow blocks, comprising a through-hole whose shape matches the shape of the rail, allowing the rail to slide through the block.

According to further embodiments of the invention, in the neutral position the wheel cover holder is configured to arrange the wheel cover flush to the body of the vehicle.

The aerodynamic drag reduction effect may be greatest when the wheel cover is a neutral position. In embodiments where the wheel cover holder comprises a wheel cover, the wheel cover is arranged flush to the outside of the body of the vehicle in the neutral position. In this position, the airflow may be streamlined around the vehicle. This may reduce aerodynamic drag, and may increase the power efficiency of the vehicle. The wheel cover holder remains in a neutral position when the wheels are in a neutral position, i.e., when the vehicle is driving substantially straight ahead. At high velocities of the vehicle, the aerodynamic drag experienced by the vehicle increases and typically turning angles are relatively small. The wheel cover holder is optionally configured to remain in a neutral position if the turning angle of the wheel is smaller than a turning angle threshold. This may further reduce the aerodynamic drag experienced by the vehicle at high velocities and/or when the turning angle of the wheel is relatively small.

According to further embodiments of the invention, the wheel cover holder further comprises mechanism biasing element configured to bias the wheel cover holder towards the neutral position.

After a wheel is returned to a neutral position after a steering manoeuvre, the wheel cover holder has to be brought to a neutral position as well. In these embodiments, the wheel cover holder is biased towards the neutral position by one or more biasing element(s).

For example, the biasing element is a spring mechanism, which biases the wheel cover holder to a neutral position by a spring force. The spring mechanism comprises one or more springs. Optionally, at least a first spring is provided for returning the wheel cover holder to the neutral position after being turned to a first side, and at least second spring is provided for returning the wheel cover holder to the neutral position after being turned to a second side. For example, the first spring is configured to exert a first spring force on the wheel cover holder and the second spring is configured to exert a second spring force on the wheel cover holder. The first spring force and the second spring force are equal in size but opposite in direction when the wheel cover holder is arranged in the neutral position. For example, the first and second springs are connected to opposite sides of the guiding slot with one side, and to vehicle body element with the other side. In another example, the first and second springs are connected to the body with one side, and to the wheel cover holder with the other side.

In another example, in which the wheel cover holder comprises a rail, arranged to be moveable relative to one or more guide elements, the guide elements being attachable to the vehicle body or wherein the rail may be attachable to the vehicle body and the guide elements may be part of the wheel cover holder, the biasing element is an indent in the rail. The rail is arranged together with a guide element to guide the wheel cover holder such that the wheel cover holder's motion is controlled. The indent is arranged such that a guide element engages it if the wheel cover holder is in a neutral position. As such, the indent and the engaged guide element bias the wheel cover holder to the neutral position. The guide element engages the indent by, for example, a spring, which moves the guide element in the engaged position if the indent is moved along the guide element. In this example, the guide element disengages the indent if the force exerted on it is greater than the force of the spring. The force exerted on the guide element is for example the result of a turning motion of the rail, causing an edge of the indent to push towards the guide element, opposite the spring force.

In another example, the biasing element is magnet system, which biases the wheel cover holder to a neutral position by a magnetic force. The magnet system comprises one or more magnets. The magnets are arranged to exert a force on parts of the wheel cover holder such as for example on the vehicle body element in one embodiment, or the rail in another embodiment.

According to further embodiments of the invention, the wheel cover holder further comprises a vehicle body element guide arranged in the at least one guiding slot for guiding the vehicle body element.

The vehicle body element guide is for example arranged on the underside and/or the top-side of the inside of the guiding slot. The vehicle body element guide is for example a rail or a rolling element. The vehicle body element guide is arranged such that the vehicle body element is guided by the vehicle body element guide in the direction in which the wheel cover holder is turned. The vehicle body element guide is arranged such that the wheel cover holder's motion is controlled. In particular, the vehicle body element guide may reduce or eliminate movement of the wheel cover holder in a direction other than the direction in which the wheel cover holder is turned. In particular, the vehicle body element guide may ensure that a minimum spacing between the wheel cover holder and the inside of the wheel housing, i.e., a split line, is maintained. The vehicle body element guide may further reduce friction generated by the guiding slot moving as a result of the wheel cover holder following a turning angle of the wheel. This may result in less force being required to turn the wheel cover. This may further result in a smoother movement of the wheel cover holder and a reduction in wear of the guiding slot and/or the body element.

The invention further pertains to a combination of the wheel cover holder and an air-guiding cover. In this combination, the wheel cover holder can be any embodiment of the wheel cover holder as described above and/or below and the air-guiding cover can be any embodiment of the air-guiding cover as described above or below. For example, the air-guiding cover is a wheel cover, and the wheel cover holder is configured to hold the wheel cover substantially vertically adjacent to the wheel on an outside of the wheel. For another example, the air-guiding cover is a butterfly hole cover, and the wheel cover holder is configured to hold the butterfly hole cover substantially horizontally adjacent to the wheel on an inside of the wheel.

One or more of the objects of the invention are achieved by providing a vehicle comprising the wheel cover holder according to the invention, wherein optionally the vehicle is an automobile, e.g. a commercially available automobile for use on public roads.

The vehicle might use different types of sources of energy for propelling the vehicle. For example, its engine may use fuel, electricity, e.g., drawn from batteries, or a hybrid energy source. Emission of a vehicle might be reduced by reducing the amount of power that is required to propel the vehicle on a surface. A vehicle experiences several forms of friction, which increases the amount of power that is required to propel the vehicle on a surface. For example, rolling resistance is experienced due to the friction between the wheels and the surface on which the vehicle drives, and aerodynamic drag is experienced due to the airflow around the vehicle.

By optimizing the shape of the vehicle, drag may be reduced, which results in less force required to drive the vehicle with a particular velocity. Since less force and torque needs to be generated by the engine driving the wheels of the vehicle, the motor consumes less power, increasing its efficiency and reducing the overall power required to travel in the vehicle. The energy-reducing effect may be greatest at high velocities of the vehicle, since the aerodynamic drag increases quadratically with the velocity. In particular for electrical vehicles, the range of the vehicle for a particular battery capacity needs to be maximized to e.g. increase adoption, as charging of batteries is a timely operation. If the power is supplied to the vehicle at least partly by solar panels, the range of the vehicle may be further increased, but it may increase the weight of the vehicle, which reduces its power efficiency. In particular for electrical vehicles and vehicles powered by solar panels, it is an object to increase their power efficiency, reducing their power draw, and increasing their range, by optimizing the shape of the vehicle to optimize the airflow and reduce drag. The vehicle can be provided with any of the described embodiments of the wheel cover holder according to the invention.

The invention is described below with reference to the figures. These figures serve as examples to illustrate the invention, and will not be construed as limiting the scope of the claims.

In the different figures, like features are indicated by the like reference numerals.

Figure 1B:
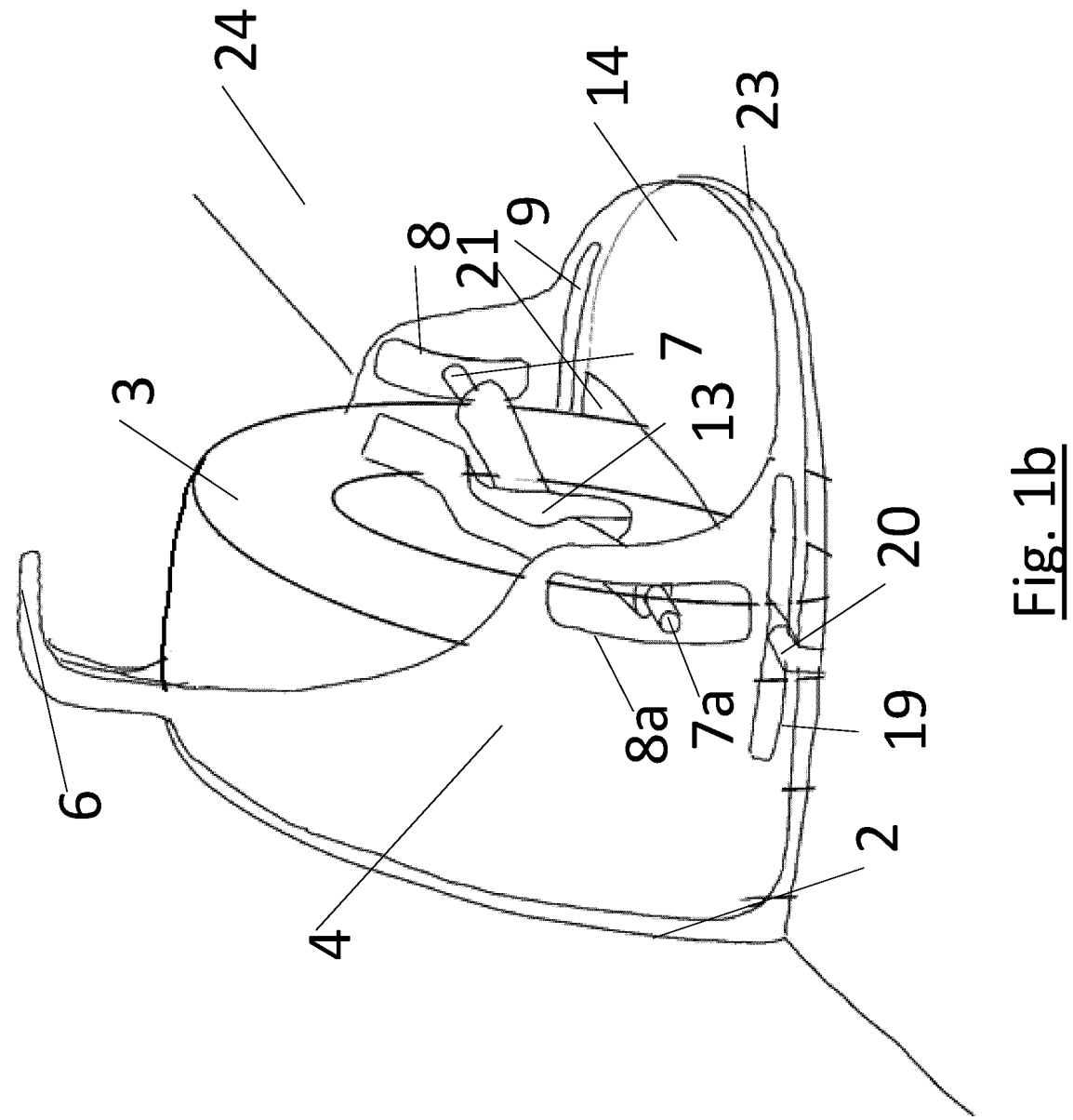
Figure 1C:
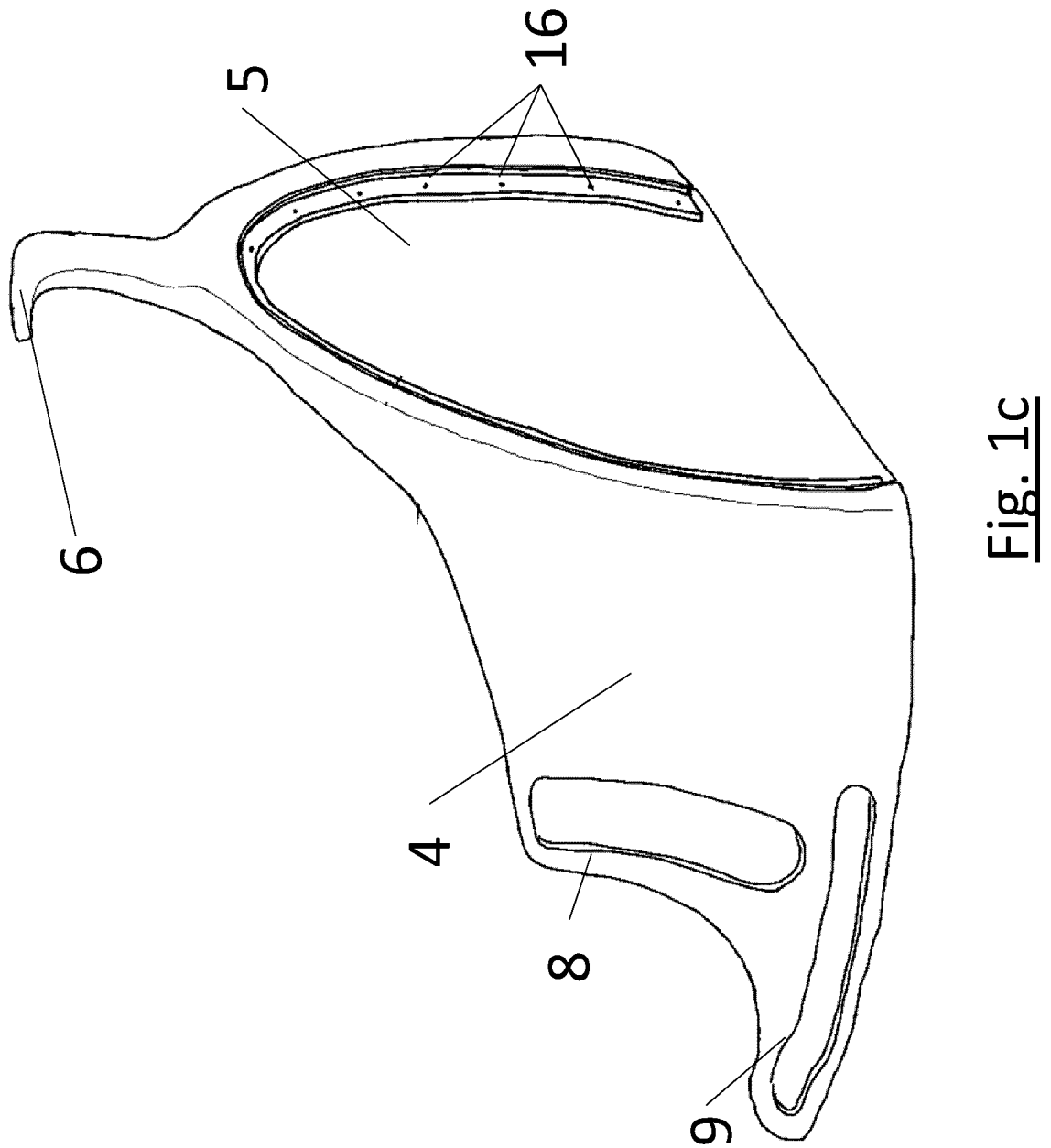

In the figures:

FIG. 1a schematically shows a side view of the body of a vehicle according to an embodiment of the invention, FIG. 1b schematically shows a view of the wheel cover holder from inside of the body of a vehicle according to an embodiment of the invention, FIG. 1c schematically shows the wheel cover holder according to an embodiment of the invention.

Figure 2:
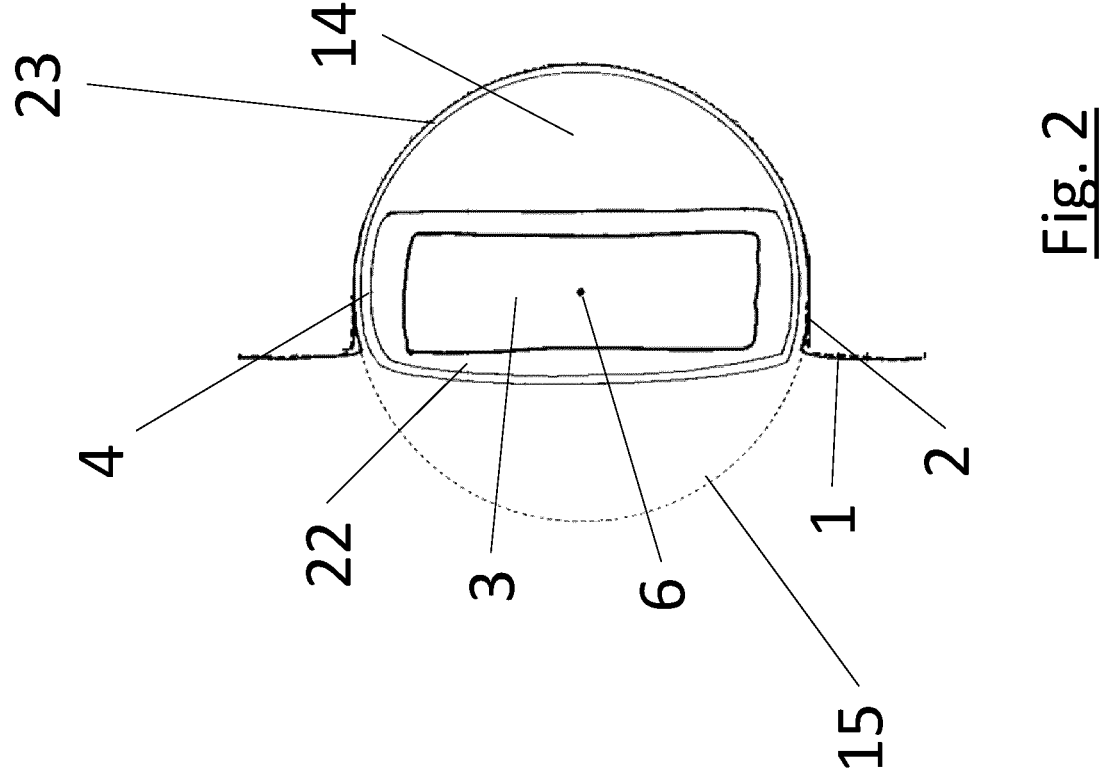
Figures 3A, 3B, 3C:
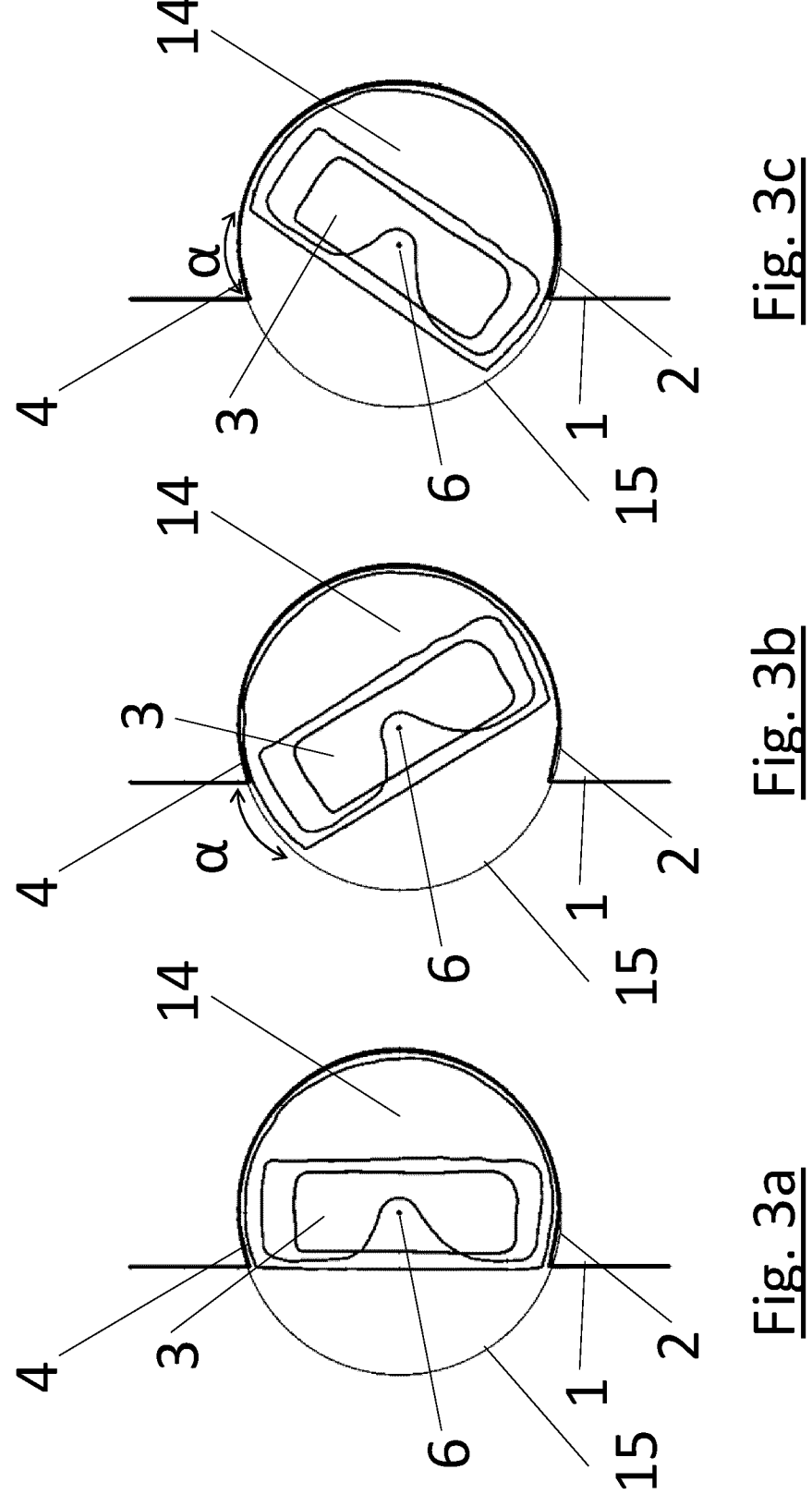
Figures 4A, 4B:
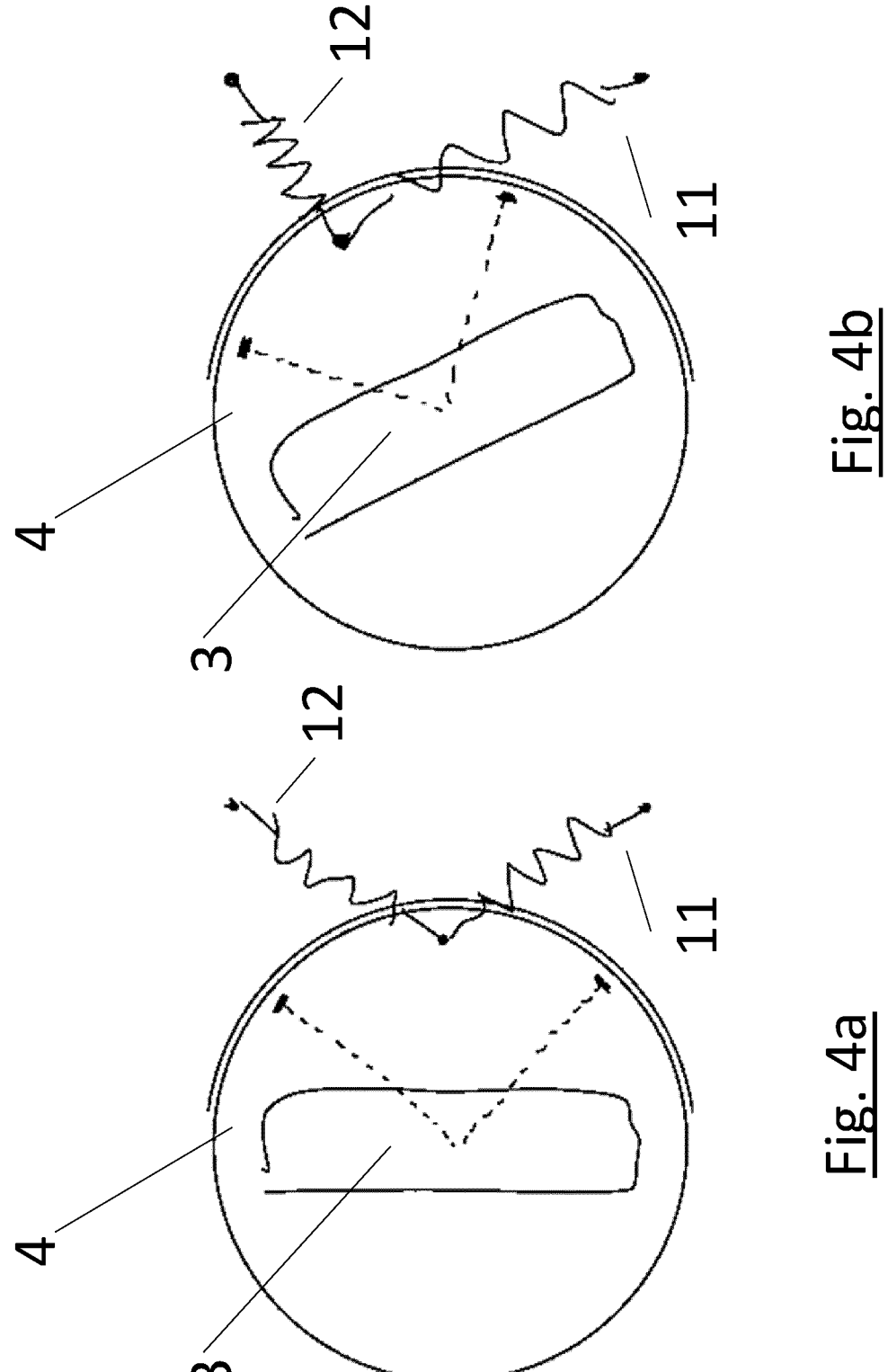
Figure 5:
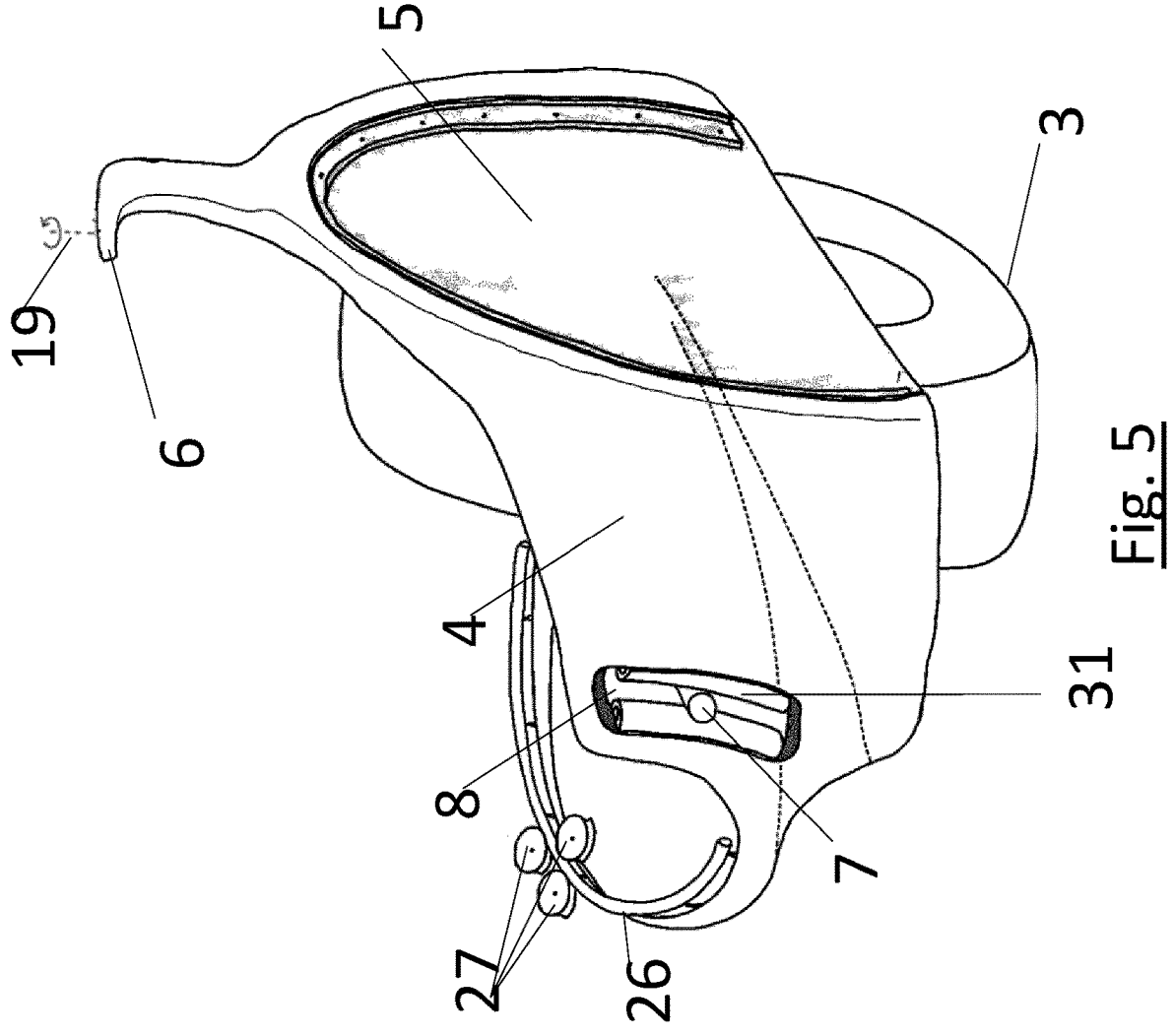
Figure 6:
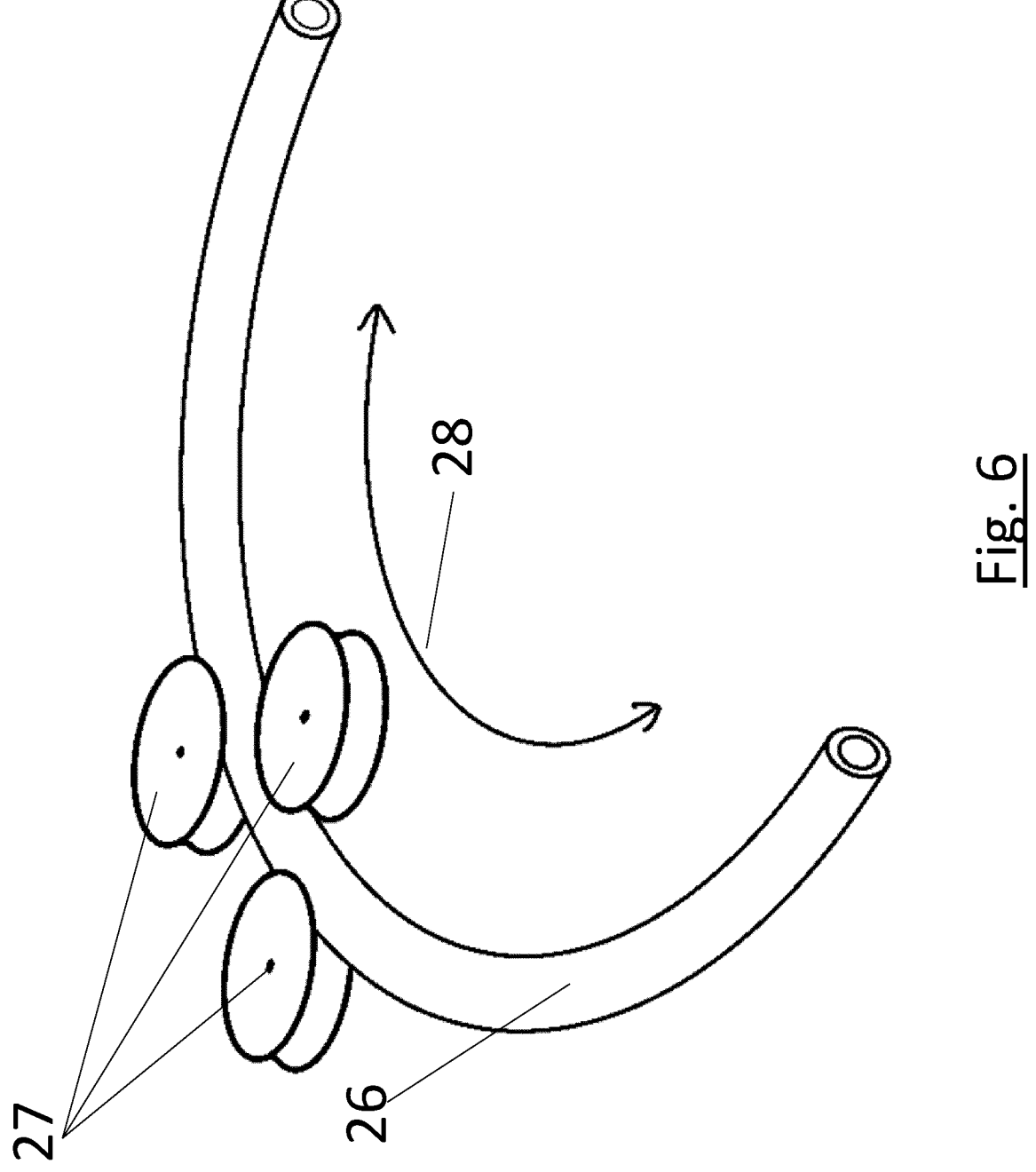
Figure 6A:
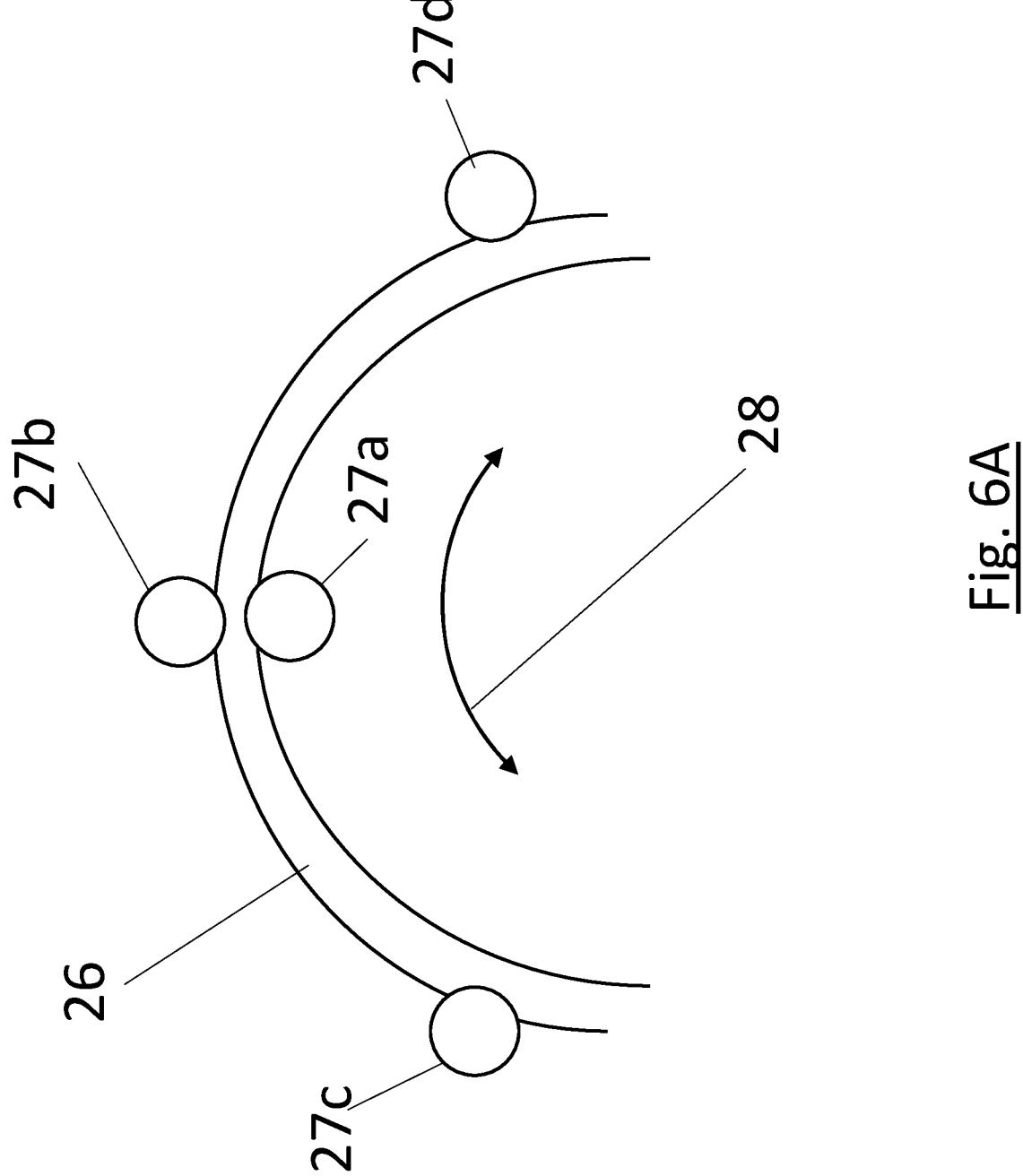
Figure 7:
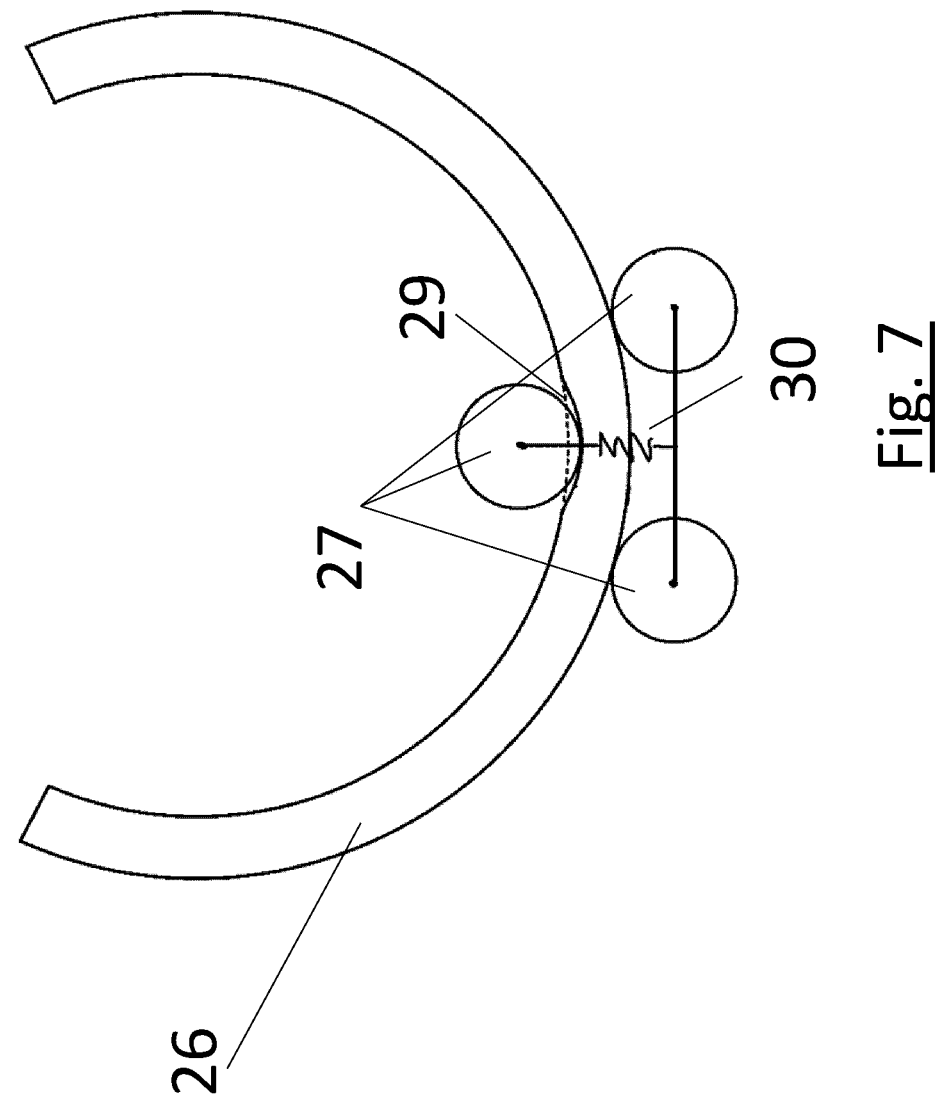
Figure 8:
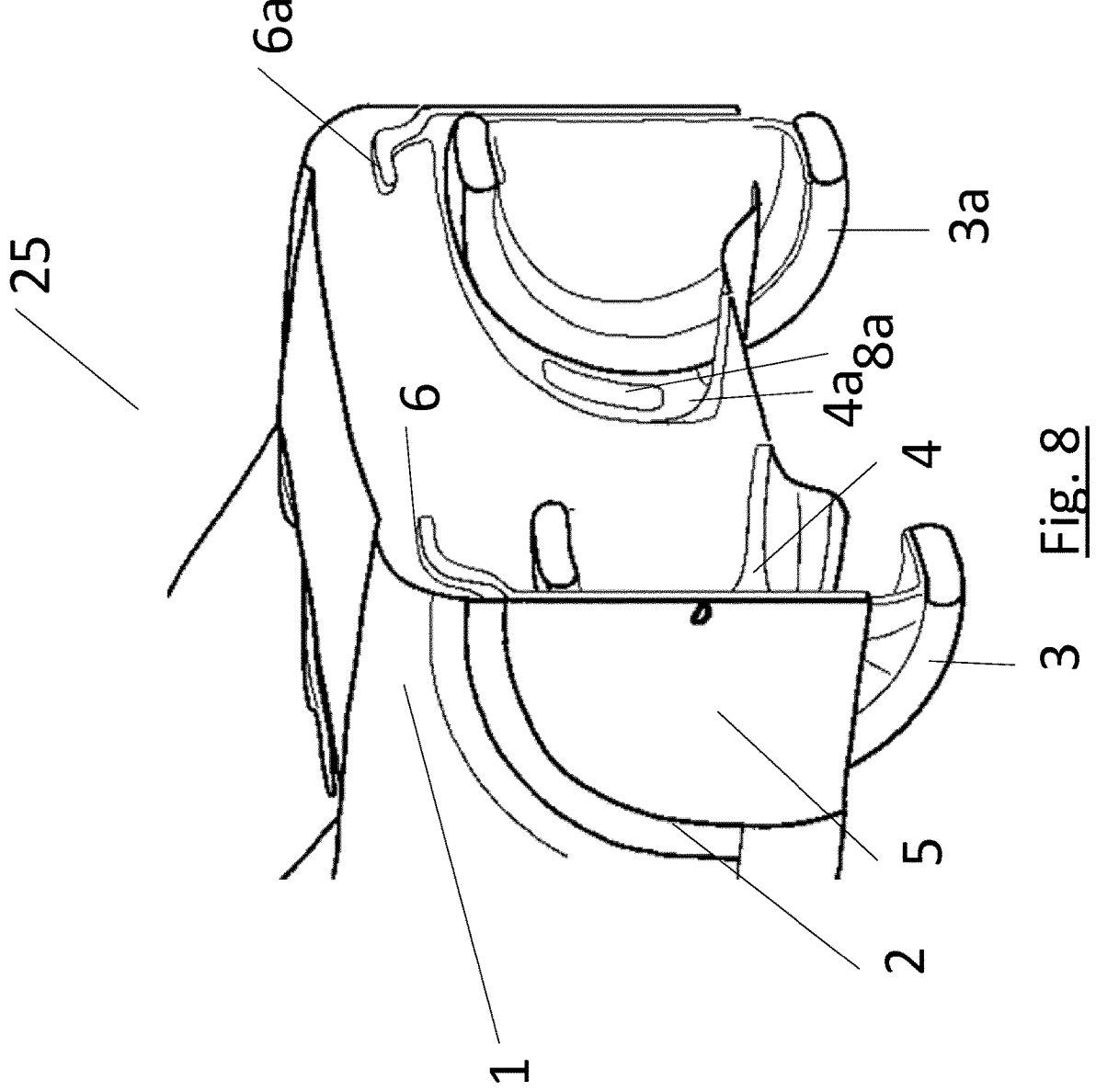
Figure 9:
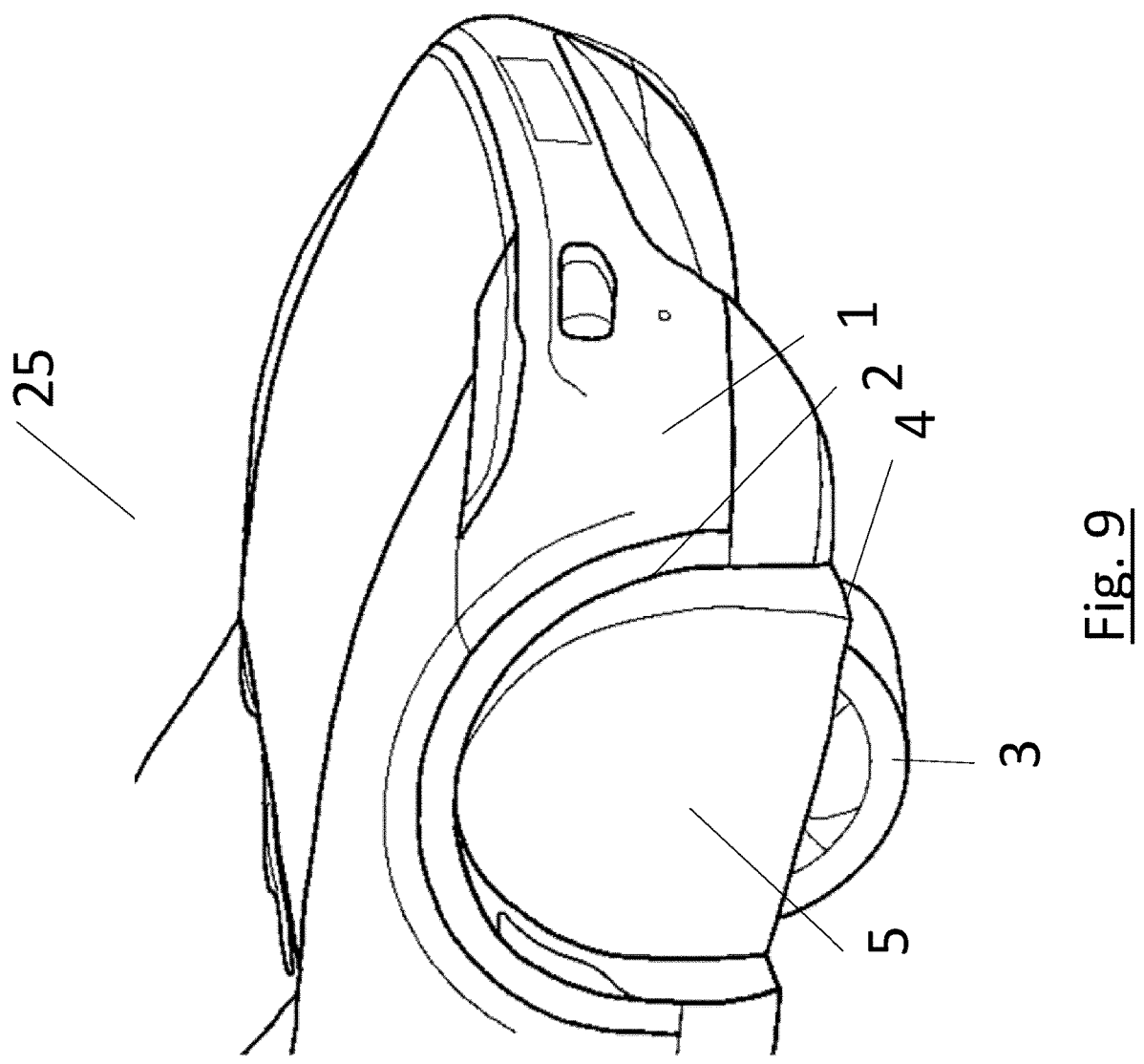

FIG. 2 schematically shows a top view of the wheel cover holder according to an embodiment of the invention, FIGS. 3a, 3b and 3c schematically show a top view of the wheel cover holder according to an embodiment of the invention, FIGS. 4a and 4b schematically show a top view of the wheel cover holder according to an embodiment of the invention, FIG. 5 schematically shows the wheel cover holder according to an embodiment of the invention, FIG. 6 schematically shows a side view of a mechanism for guiding the wheel cover holder according to an embodiment of the invention, FIG. 6A schematically shows a variant of the mechanism of FIG. 6, in top view, FIG. 7 schematically shows a top view of a mechanism for guiding the wheel cover holder according to an embodiment of the invention, FIG. 8 schematically shows a partial cross-section of a vehicle according to an embodiment of the invention, FIG. 9 schematically shows a vehicle according to an embodiment of the invention.

FIG. 1a schematically shows a side view of the body 1 of a vehicle according to an embodiment of the invention and FIG. 1b schematically shows a view of the inside of the body 1 of a vehicle according to an embodiment of the invention. The vehicle can be, but is not limited to, an automobile, e.g. a commercially available automobile for use on public roads. The body comprises a wheel housing 2, which offers space to a wheel 3 of the vehicle, in which it can rotate in a forwards direction to propel the vehicle. The wheel 3 can as well turn according to a specified turning angle, by for example, the driver turning a steering wheel, which subsequently turns the wheel 3. The turning angle of the wheel 3, relative to the body 1 of the vehicle, turns the vehicle in a direction, for example to take a turn at an intersection, or to make a lane shift. The wheel 3 is arranged in the wheel housing 2. The wheel housing 2 defines a wheel housing opening 18, embodied as a substantially semi-circular cutout in the body 1. The wheel cover holder 4 is configured to hold at least one air guiding cover, which air guiding covers in this example include a wheel cover 5. The wheel cover 5 which covers the wheel housing opening 18, adjacent the wheel 3, at least partially, optionally fully. In the neutral position of the wheel 3 as shown in FIG. 1a, the wheel cover 5 is arranged flush to the body 1, closing the wheel housing opening 18 at least partially, optionally fully. As seen from the outside of the vehicle, the body 1 of the vehicle is streamlined, which may improve the airflow around the vehicle, removing some turbulent airflows that would otherwise occur within the wheel housing 2. By improving the airflow, aerodynamic drag may be reduced, which improves the energy efficiency of the vehicle.

The wheel cover holder 4 is configured to be rotatably connected to the body 1 at the top of the inside of the wheel housing 2 at a connection point 6. The connection at the connection point 6 is for example formed by a ball joint or a cylinder bearing. The wheel cover 4 optionally follows a turning angle of the wheel 3 by rotating around an axis 19 that extends vertically through the connection point 6. The wheel 3 is turnable relative to the vehicle by a turning angle by, for example, the operator of the vehicle turning a steering wheel or by an automated system actuating a steering mechanism. To connect the steering mechanism to the wheel cover holder 4, and to cause the wheel cover holder 4 to turn along with the wheel 3, a steering mechanism connector 7 is arranged in a connector slot 8 of the wheel cover holder 4. At high velocities of the vehicle, the vehicle will typically be driving on highways. In these scenarios, the turning angles of the wheel 3 will be small, since the vehicle predominantly travels in a straight line. Even if the vehicle is turned, for example to perform a lane shift, the turning angle is typically relatively small. It is therefore advantageous to keep the wheel cover 4 substantially flush to the side of the body 1 at high velocities. As such, the connector slot 8 is configured to keep a distance d between the steering mechanism connector 7 and either side of the connector slot 8 if the wheel is in a neutral position. If the wheel 3 is turned, thereby turning the steering mechanism connector 7, the steering mechanism connector 7 will not engage the connector slot 8 if the turning angle is relatively small. At larger turning angles, the steering mechanism connector 7 will engage a side of the connector slot, causing wheel cover holder 4 to turn along with the wheel 3, about the vertical axis 19 defined by the connection point 6. The wheel cover holder 4 is configured to remain in a neutral position if the turning angle is smaller than a turning angle threshold, and to turn with the wheel 3 if the turning angle is larger than the turning angle threshold. In an exemplary embodiment, the turning angle threshold is between 1-5 degrees, preferably between 2-3 degrees.

The connector slot 8 is configured to allow vertical movement of the wheel 3 relative to the wheel cover holder 4. The wheel might move in a vertical direction if, e.g., a bump in the road is encountered; typically the shock associated with this vertical movement is dampened by a spring (not shown) incorporated in the suspension of the wheel 3, said suspension connecting the wheel to the body 1 of the vehicle. To ensure that the wheel housing opening 18 is covered at least partially by the wheel cover 5, in particular close to the upper edges of the wheel housing opening, the wheel cover holder 5 is preferably kept stationary in a vertical direction with respect to the wheel housing 2 and the body 1 as a whole. The connector slot 8 has an elongated shape which allows the steering mechanism connector 7, which is configured to be connected to the steering mechanism of the vehicle (not shown), to move in a vertical direction relative to the wheel cover holder 4.

A guiding slot 9 is provided in the wheel cover holder, which is configured to hold a body element 10. The body element 10 is configured to secure the wheel cover holder 4 further in a vertical direction relative to the body 1, while allowing the wheel cover holder to turn along with the wheel. Two springs 11, 12 are provided, connecting the body element 10 to either side of the guiding slot 9. These springs are configured to bias the wheel cover holder 4 to a neutral position. For example, when the wheel 3 is turned and subsequently returned to a neutral position, the springs are configured to return the wheel cover holder 4 to a neutral position. In a neutral position, the steering mechanism connector 7 is arranged to the middle of the connector slot 8, at a distance to either side of the connector slot 8 substantially equal to d.

In FIG. 1*b*, two connector slots 8 and 8*a* of the wheel cover holder 4 are shown, which are configured to hold steering mechanism connectors 7 and 7*a*, respectively. The steering mechanism connectors 7, 7*a* are configured to be connected to the steering mechanism 13 which is configured to turn the wheel 3. A second guiding slot 19 is shown, which is configured to hold a body element 20.

A butterfly hole cover 14 is shown and is held by the wheel cover holder 4. The butterfly hole cover 14 is configured to be arranged substantially parallel to the underside 24 of the body of the vehicle. It is configured to cover the butterfly hole 21 between the wheel 3 and the inside of the wheel housing 2 at least partially, optionally fully. When viewed from the top or the bottom of the vehicle, the cutout on the underside of the vehicle is closed at least partially, optionally fully, by the butterfly hole cover 14. This may improve the airflow under the vehicle, removing some further turbulent airflows that normally occur within the wheel housing 4. By improving the airflow, aerodynamic drag may be reduced, which improves the energy efficiency of the vehicle. The butterfly hole cover 14 is held by the wheel cover holder 4, which is configured to follow a turning angle of the wheel 3. As such, the butterfly hole cover 14 will follow a turning angle of the wheel 3 as well.

The wheel cover holder 4 optionally holds only the butterfly hole cover 14, i.e., it is an alternative for the wheel cover 5. Alternatively, the wheel cover holder 4 optionally only holds the wheel cover 5. Alternatively, the wheel cover holder 4 optionally holds both the wheel cover 5 and the butterfly hole cover 14. In the shown embodiment, the wheel cover holder 4 is configured to hold the butterfly hole cover 14 and the wheel cover 5. In such an embodiment, both the aerodynamic drag resulting from the wheel housing opening 18 and the butterfly hole 21 between the wheel 3 and the inside of the wheel housing 2 are reduced by covering them at least partially with a wheel cover 5 and a butterfly hole cover 14, respectively. In an embodiment, the wheel cover holder 5 and the butterfly hole cover 14 are a unitary element, and/or the wheel cover holder 4 and the wheel cover 5 are a unitary element, and/or the wheel cover holder 4, the wheel cover 5 and the butterfly hole cover 14 are a unitary element.

FIG. 1*c* schematically shows the wheel cover holder 4 separately, which is configured to hold a butterfly hole cover (not shown) and/or a wheel cover 5. The wheel cover holder 4 further comprises a connection point 6, at which the wheel cover holder 4 may be rotatably connected to the inside of a wheel housing (not shown). The wheel cover holder 4 further comprises a connector slot 8, which is configured to hold a steering mechanism connector (not shown) and a guiding slot 9, which is configured to hold a body element (not shown). In an embodiment, the wheel cover is configured to be removably attached to the wheel cover holder 4. For example, the wheel cover may be attached to the wheel cover holder using connectors 16. These connectors may include screws, bolts, etc.

FIG. 2 schematically shows a top view of an embodiment of the wheel cover holder according to the invention. It schematically shows the turning circle 15 of the wheel cover holder 4, with the centre being defined by the connection point 6. This figure schematically shows a space 22 that is left open on the underside of the vehicle: there is relatively small space 22 provided between the wheel 3 and the wheel cover holder 4. This space 22 allows the wheel to turn within the wheel cover holder 4, without the wheel cover holder 4 turning along with a turning angle of the wheel 3, remaining in a neutral position. Further, minimal space 23, in the form of a split line, is provided between the wheel cover holder 4 and the inside of the wheel housing 2, allowing the wheel cover holder 4 to turn. By minimizing the space 22 between the wheel cover holder 4 and the wheel 3 and the space 23 between the wheel cover holder 4 and the inside of the wheel housing 2 wheel cover holder, the aerodynamic drag may be maximally reduced as the spaces where turbulent airflow may occur are reduced. The butterfly hole cover 14 has a substantially semi-circular shape. The butterfly hole cover 14 is configured to at least partially, optionally fully, cover a butterfly hole that is cut out of the underside of the body 1. Such butterfly holes allow the wheel 3 to be turned over a turning angle, without making contact with the inside of the wheel housing 2. In the shown embodiment, the wheel cover holder 4 holds the butterfly hole cover 14. When the wheel 3 is turned over a turning angle, the wheel cover holder 4 is configured to turn along with the wheel 3.

FIGS. 3*a*, 3*b*, and 3*c* further schematically show additional top views of the embodiment of the wheel cover holder according to the invention. They schematically show three positions of the wheel cover holder: FIG. 3*a* schematically shows a neutral position, where the wheel 3 and the wheel cover holder 4 are not turned, for example when the vehicle drives straight ahead or is standing still. The wheel cover (not shown) is arranged substantially flush to a side of the body of the vehicle, which may improve air flow along the body of the vehicle, and reduce drag caused by turbulent air flows. FIG. 3*b* and FIG. 3*b* schematically show a position of the wheel 3 if the wheel is turned with a turning angle α. If the turning angle α is larger than the turning angle threshold, part of the wheel 3 is moved outside of the body 1 of the vehicle, and the wheel cover holder 4 is turned along with the wheel 3. At these turning angles, aerodynamic drag increases, since the wheel cover holder 4 is no longer arranged substantially flush to a side of the body 1. Such turning angles are typically encountered at low velocities, for example, when the vehicle performs a turn. At higher velocities, turning angles are typically smaller as the direction of the vehicle only has to be adjusted slightly, for example on highways. As such, at high velocities, when aerodynamic drag experienced by the vehicle is greatest, the wheel cover holder 4 is configured to maximally reduce drag.

FIGS. 4*a* and 4*b* schematically show a similar top view of the wheel cover holder, which comprises springs 12 and 13, forming a spring mechanism, and which bias the wheel cover holder to a neutral position by a spring force. In a neutral position of the wheel cover holder 4, the springs are at rest. When the wheel 3 is turned at an angle larger than the turning angle threshold, the wheel cover holder 4 turns along with the turning angle of the wheel 3, which stretches the springs 11, 12. If the wheel 3 is returned to a neutral position, the springs 11, 12 are configured to return the wheel cover holder 4 to a neutral position. The first spring 11 is provided for returning the wheel cover holder 4 to the neutral position after being turned to a first side, and the second spring 12 is provided for returning the wheel cover holder 4 to the neutral position after being turned to a second side. The springs 11 and 12 exert a first spring force and a second spring force on the wheel cover holder, respectively, wherein the first spring force and the second spring force are equal in size but opposite in direction when the wheel cover holder 4 is arranged in the neutral position.

A further embodiment according to the invention is described with reference to FIGS. 5-7.

FIG. 5 schematically shows a side view of the wheel cover holder 4 according to the embodiment of the invention. A wheel 3 of a vehicle is shown, which is at least partially, optionally fully, covered by the cover holder 4 and the wheel cover 5. The wheel 3 can turn according to a specified turning angle, by for example, the driver turning a steering wheel, which subsequently turns the wheel 3. The turning angle of the wheel 3, relative to the body 1 of the vehicle, may turns the vehicle in a direction, for example to take a turn at an intersection, or to make a lane shift. The wheel cover holder 4 is configured to hold at least one air guiding cover, which air guiding covers in this example includes a wheel cover 5. The wheel cover is arranged adjacent the wheel 3.

The wheel cover holder 4 is rotatably connected to the body 1 at the top of the inside of the wheel housing 2 at a connection point 6. The connection at the connection point 6 may be formed by a ball joint or a cylinder bearing. The wheel cover 4 optionally follows a turning angle of the wheel 3 by rotating around an axis 19 that extends vertically through the connection point 6. The wheel 3 is turnable relative to the vehicle by a turning angle by, for example, the operator of the vehicle turning a steering wheel or by an automated system actuating a steering mechanism. To connect the steering mechanism to the wheel cover holder 4, and to cause the wheel cover holder 4 to turn along with the wheel 3, a steering mechanism connector 7 is arranged in a connector slot 8 of the wheel cover holder 4. At high velocities of the vehicle, the vehicle will typically be driving on highways. In these scenarios, the turning angles of the wheel 3 will be small, since the vehicle predominantly travels in a straight line. Even if the vehicle is turned, for example to perform a lane shift, the turning angle is typically relatively small. It is therefore advantageous to keep the wheel cover 4 substantially flush to the side of the body 1 at high velocities. As such, the connector slot 8 is configured to keep the wheel cover 4 substantially flush to the side of the body 1 if the turning angle is relatively small. In the embodiment, the sides of the connector slot are lined with protective material 31, such as for example rubber. If the wheel 3 is turned, thereby turning the steering mechanism connector 7, the steering mechanism connector 7 will not engage the connector slot 8 if the turning angle is relatively small. Optionally, the protective material 31 is compressible, and is arranged such that the steering mechanism connector 7 compresses the protective material 31 if the turning angle is smaller than the turning angle threshold. At larger turning angles, the steering mechanism connector 7 will engage a side of the connector slot, causing wheel cover holder 4 to turn along with the wheel 3, about the vertical axis 19 defined by the connection point 6. The wheel cover holder 4 is configured to remain in a neutral position if the turning angle is smaller than a turning angle threshold, and to turn with the wheel 3 if the turning angle is larger than the turning angle threshold. In an exemplary embodiment, the turning angle threshold is between 1-5 degrees, preferably between 2-3 degrees.

The connector slot 8 is configured to allow vertical movement of the wheel 3 relative to the wheel cover holder 4. The wheel might move in a vertical direction if, e.g., a bump in the road is encountered; typically the shock associated with this vertical movement is dampened by a spring (not shown) incorporated in the suspension of the wheel 3, said suspension connecting the wheel to the body 1 of the vehicle. To ensure that the wheel housing opening 18 is covered at least partially by the wheel cover 5, in particular close to the upper edges of the wheel housing opening, the wheel cover holder 5 is preferably kept stationary in a vertical direction with respect to the wheel housing 2 and the body 1 as a whole. The connector slot 8 has an elongated shape which allows the steering mechanism connector 7, which is configured to be connected to the steering mechanism of the vehicle (not shown), to move in a vertical direction relative to the wheel cover holder 4.

The wheel cover holder 4 in this embodiment further comprises a rail 26. The rail 26 is arranged to be moveable relative to three guide elements 27 along a direction 28, in which the wheel 3 is turned. In this example, the rail 26 is a tube with a circular cross-section, and the guide elements 27 are grooved wheels, along which the rail 26 slides. Optionally, the rail 26 comprises an indent 29, and the guide elements 27 are biased by a spring 30 to engage the indent 29. If a guide element 27 engages the indent 29, the wheel cover holder 4 is biased to the neutral position, in which is arranged substantially flush to the vehicle body 1.

Other arrangements of the rail 26 and guide elements 27 than the arrangement shown in FIG. 6 are possible, for example with respect to the placement of the guide elements 27 relative to the rail 26 and with respect to the number of guide elements 27. FIG. 6A schematically shows such a variant of the arrangement of the rail 26 and the guide elements 27. In the variant of FIG. 6A, the rail 26 again is for example a tube with a circular cross-section, and the guide elements 27 for example are again grooved wheels, along which the rail 26 slides. In the variant of FIG. 6A, four guide elements 27a, 27b, 27c, 27d are provided. Two of these guide elements 27a, 27b form a guide element pair, with the guide elements 27a, 27b of the guide element pair being arranged on opposite sides (as seen in radial direction) of the rail 26. The other two guide elements 27c, 27d are arranged for example on the same side (as seen in radial direction) of one of the guide elements 27a, 27b of the pair of guide elements, but arranged at a distance from the pair of guide elements. Optionally, the guide elements 27a, 27b of the pair of guide wheels are biased towards each other, e.g. by a spring, to engage an optional indent in the rail 26.

The embodiment of FIG. 5-FIG. 7 may further be explained by referring to FIG. 2. The rail 26 and the guide elements 27 are arranged to reduce or eliminate movement of the wheel cover holder 4 in a direction other than the direction 28 in which the wheel cover holder 4 and the wheel 3 are turned. In particular, the rail 26 and the guide elements 27 ensure that a minimum spacing 23 between the wheel cover holder 4 and the inside of the wheel housing 2, i.e., a split line, is maintained. By minimizing the space 23 between the wheel cover holder 4 and the inside of the wheel housing 2, the aerodynamic drag may be maximally reduced as the spaces where turbulent airflow may occur are reduced. Further, by ensuring a minimal space 23 between the wheel cover holder 4 and the inside of the wheel housing 2, it is avoided that the wheel cover holder 4 makes contact with the inside of the wheel housing 2, which further avoids drag and/or wear of parts.

FIG. 8 schematically shows a partial cross-section of a vehicle 25 according to the invention. Two front wheels 3a and 3b are shown, and two wheel cover holders 4a and 4b for the wheels 3a and 3b, respectively. The wheel cover holders 4a and 4b are rotatably connected to the vehicle body 1 at connection points 6a and 6b, respectively. The connection at the connection point 6 are for example formed by a ball joint or a cylinder bearing. A connector slots 8a of the wheel cover holder 4a is shown, which is configured to hold a steering mechanism connectors, which is connected to a steering mechanism configured to turn the wheel 3a. The wheel cover holders 4 and 4a are configured to remain in a neutral position if a turning angle of the wheel 3 or 3a, respectively, is smaller than a turning angle threshold, and to turn with the wheel 3 or 3a, respectively, if the turning angle is larger than the turning angle threshold. In an exemplary embodiment, the turning angle threshold is between 1-5 degrees, preferably between 2-3 degrees. Wheel cover holder 4a holds wheel cover 5a, which covers the wheel 3a at least partially, optionally fully. The wheels 3 and 3a are in a neutral position, which is the case, e.g., if the vehicle 25 is standing still or is travelling straight ahead. In the neutral position, the wheel cover 5a is arranged flush to the body 1. The airflow around the vehicle 25 is at least partially directed by the wheel cover 5a along the body 1 towards the back of the vehicle 25. The wheel cover 5a may reduce turbulent airflow that normally enters the wheel housing 2 through the wheel housing opening by covering the wheel housing opening at least partially, optionally fully.

FIG. 9 schematically shows a vehicle 25 according to the invention. The right front wheel 3 is shown, which is covered partially by the wheel cover holder 4. A wheel cover 5 is held by the wheel cover holder 4, which covers the opening of the wheel housing 2, which is a substantially semicircular cut-out of the body 1. The wheel 3 is turned, which may be the case, e.g., if the vehicle 25 is performing a lane shift or turning at an intersection. The wheel cover holder 4, as well as the wheel cover 5 is turned along with the wheel 3. The airflow around the vehicle 25 is at least partially directed by the wheel cover 5 along the body 1 towards the back of the vehicle 25. The wheel cover 5 may reduce turbulent airflow that normally enters the wheel housing 2 through the wheel housing opening by covering the wheel housing opening at least partially, optionally fully.

The invention claimed is:

1. A wheel cover holder for a wheel of a vehicle, which wheel is turnable relative to the vehicle over a turning angle, wherein:

the wheel cover holder is configured to hold at least one air-guiding cover;

the wheel cover holder being configured to be connected to a steering mechanism of the wheel wherein the wheel cover holder is turnable by the steering mechanism during the steering of the wheel, wherein the wheel cover holder is configured to turn along with the wheel if the turning angle is greater than a turning angle threshold, and to remain in a neutral position if the turning angle is smaller than the turning angle threshold, and wherein the wheel cover holder comprises at least one connector slot for receiving a steering mechanism connector, the at least one connector slot configured to:

a. allow the steering mechanism connector to move relative to the wheel cover holder in the direction of the turning angle of the wheel if the turning angle is smaller than the turning angle threshold, and b. be moved by the steering mechanism connector if the turning angle is larger than the turning angle threshold for turning the wheel cover holder along with the wheel.

2. The wheel cover holder according to claim 1, wherein the at least one air-guiding cover comprises a wheel cover, wherein the wheel cover holder is configured to hold the wheel cover substantially vertically adjacent to the wheel on an outside of the wheel.

3. The wheel cover holder according to claim 1, wherein the at least one air-guiding cover comprises a butterfly hole cover, wherein the wheel cover holder is configured to hold the butterfly hole cover substantially horizontally adjacent to the wheel on an inside of the wheel.

4. The wheel cover holder according to claim 3, wherein the wheel cover holder is configured to hold both the wheel cover and the butterfly hole cover.

5. The wheel cover holder according to claim 1, wherein the wheel cover holder is configured to allow the wheel to move in a vertical direction, relative to the wheel cover holder.

6. The wheel cover holder according to claim 1, wherein the at least one connector slot is configured to allow the steering mechanism connector to move in a vertical direction relative to the wheel cover holder during movement of the wheel in the vertical direction.

7. The wheel cover holder according to claim 1, wherein the wheel cover holder comprises at least one guiding slot for receiving a vehicle body element, wherein the at least one guiding slot is configured to allow the wheel cover holder to turn relative to the vehicle body element.

8. The wheel cover holder according to claim 1, wherein the wheel cover holder comprises a rail arranged to be moveable relative to one or more guide elements, the guide elements being attachable to a vehicle body of the vehicle, or wherein the wheel cover holder comprises one or more guide elements which are moveable relative to a rail, which rail is attachable to a vehicle body of the vehicle.

9. The wheel cover holder according to claim 1, wherein the wheel cover holder further comprises a biasing element configured to bias the wheel cover holder to the neutral position.

10. The wheel cover holder according to claim 1, further comprising a ball joint or a cylinder bearing for connecting the wheel cover holder to a vehicle body of the vehicle.

11. The wheel cover holder according to claim 1, further comprising a wheel cover, wherein the wheel cover is attached to the wheel cover holder in a releasable or a non-releasable manner.

12. The wheel cover holder according to claim 3, wherein the wheel cover holder and the butterfly hole cover are integrated with each other into a unitary element, and/or wherein the wheel cover holder and the wheel cover are integrated with each other into a unitary element, and/or wherein the wheel cover holder, the wheel cover and the butterfly hole cover are integrated with each other into a unitary element.

13. The wheel cover holder according to claim 1, wherein the turning angle threshold is between 1-5 degrees.

14. The wheel cover holder according to claim 1, wherein in the neutral position the wheel cover holder is configured to arrange the at least one air-guiding cover flush to vehicle body.

15. A vehicle comprising the wheel cover holder according to claim 1.

* * * * *